Aug. 13, 1968     L. B. GRAY     3,396,410
STERILIZER FOR USE WITH WATER CLOSETS
Filed May 25, 1966
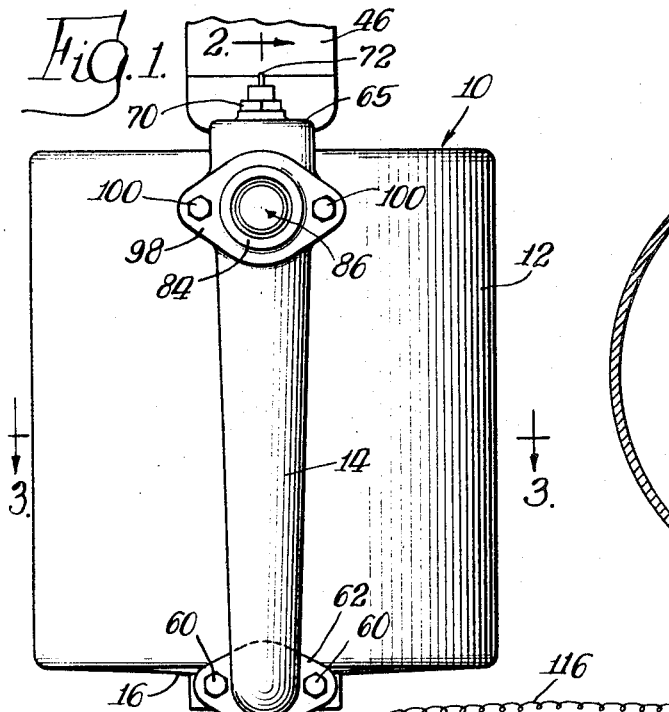
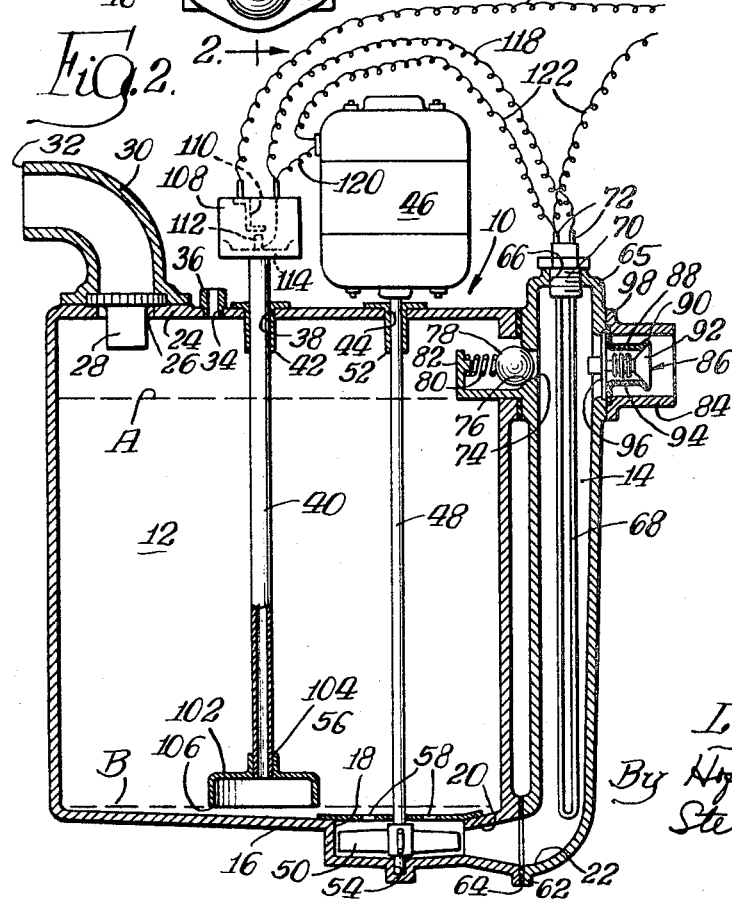
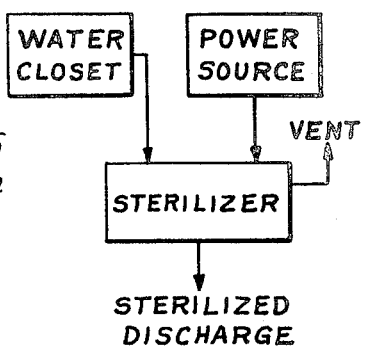
Inventor:—
Lysle B. Gray,
By Hofgren, Wegner, Allen,
Stellman & McCord
Attys.

United States Patent Office 3,396,410
Patented Aug. 13, 1968

3,396,410
STERILIZER FOR USE WITH WATER CLOSETS
Lysle B. Gray, Baltimore, Md., assignor to Brunswick Corporation, a corporation of Delaware
Filed May 25, 1966, Ser. No. 552,925
10 Claims. (Cl. 4—40)

This invention relates to a sterilizer for use with water closets, and more specifically, to a controlled discharge sterilizing device that is particularly well suited for use with a water closet on a boat or the like.

With the increased number and size of boats used both on inland waters and on the sea, it has become more and more undesirable to discharge raw organic wastes from water closets in such boats directly into the water because of the polluting effects thereof. The prior art has recognized the undesirability of such discharge of raw wastes into navigatable waters and have suggested a large number of devices that may be used to destroy the harmful bacteria contained in such organic wastes before the wastes are discharged into the water. Generally, such prior art devices have contemplated the complete combustion of the organic wastes prior to discharge. Of course, such complete combustion of the organic wastes will completely destroy the harmful bacteria contained in the wastes thereby obviating any pollution problem. However, because complete combustion of the organic wastes is required by such prior devices, they have proved unsatisfactory insofar as the power required to produce complete combustion is of a relatively large magnitude and therefore, the use of such devices is relatively expensive. Furthermore, because of the temperature required to produce such complete combustion, the devices may be relatively complex in that a good deal of insulation is required in order to prevent the device from becoming a fire hazard.

It is, therefore, the primary object of the invention to provide a new and useful controlled discharge sterilizer adapted to be used with water closets for sterilizing liquid mixtures containing organic wastes prior to discharge thereof that is of simple construction and which may be economically operated.

More specifically it is an object of the invention to provide such a sterilizer that merely heats the liquid mixture containing the organic wastes to a temperature that is sufficient to destroy or neutralize the harmful bacteria contained therein as opposed to heating the organic wastes to the point of complete combustion.

Another object of the invention is the provision of a sterilizing device such as that mentioned in the preceding paragraph wherein a housing is provided for receiving the liquid mixture of organic wastes, the housing including a heating zone, means for circulating the liquid mixture within the housing and means responsive to the attainment of a sterilizing temperature by the liquid within the housing for discharging the liquid mixture contained therein.

Still another object of the invention is the provision of a sterilizing device such as that in the preceding paragraph wherein the housing is divided into a tank and a sterilizing chamber and includes means defining a continuous flow path including the tank and the sterilizing chamber, pump means for circulating the liquid mixture through the continuous flow path, and heating means associated with the sterilizing portion for heating the liquid mixture circulated therethrough by the pump means to a sterilizing temperature whereupon the temperature responsive discharge means will discharge the liquid mixture from the housing upon its attaining the sterilizing temperature.

Other objects and advantages will become apparent from the following description taken in connection with the accompanying drawings in which:

FIG. 1 is a side elevational view of a sterilizer embodying the invention;
FIG. 2 is a vertical section taken approximately along the line 2—2 of FIG. 1;
FIG. 3 is a horizontal section taken approximately along the line 3—3 of FIG. 1; and
FIG. 4 is a block diagram of a system in which the sterilizer is adapted to be used.

With reference to FIGS. 1 and 2, a sterilizer made according to the invention is seen to comprise a housing, generally designated 10. More specifically, the housing 10 may be divided into a tank 12 and a sterilizing chamber 14, both of which may be formed by suitable fabricating methods.

The tank 12 includes a bottom 16 which may slope downwardly from the sides of the tank 12 to a pocket 18. The pocket 18 includes at one end thereof, an outlet 20 which communicates with a lower, inlet 22 of the sterilizing chamber 14.

The upper end 24 of the tank 12 includes an opening 26 in which a joker valve 28 is disposed. A conduit 30 is disposed on the upper end 24 of the tank 12 about the aperture 26 and together therewith defines an inlet to the tank 12. The end 32 of the conduit 30 is adapted to be connected to the discharge conduit of a conventional water closet such that the liquid mixture including organic wastes discharged from the water closet will pass through the conduit 30 and into the tank 12. In this respect the joker valve 28 acts as a check valve to permit the liquid mixture discharged from the water closet to enter into the tank 12 while precluding the back flow of liquid or gases from the tank 12 to the water closet.

The upper end 24 of the housing 10 includes a second aperture 34 to which a tube 36 is connected. As will be seen, the contents in the housing 10 are subjected to heat during a sterilizing cycle and as a result, pressure may be built up within the housing 10. If the housing 10 is fabricated with sufficient strength so as to withstand the pressure increase, the aperture 34 is unnecessary. However, if the housing 10 is fabricated of relatively light materials and would be unable to withstand the pressure buildup, the aperture 34 and the tube 26 will permit communication with a suitable vent to preclude such pressure buildup. A pressure relief valve (not shown) may be associated with the tube 36.

The upper end 24 of the housing 10 includes still another aperture 38. An elongated tube 40 which forms a portion of a control device for the sterilizer is disposed within the aperture 38 and a suitable seal 42 is interposed between the tube 40 and the edges of the aperture 38 to prevent the passage of gas or liquid therebetween.

A fourth aperture 44 is provided in the upper end 24 of the housing 10. Disposed above the aperture is an electric motor 46 which drives a pump to circulate the liquid mixture containing the organic wastes within the housing 10. The output shaft 48 of the motor is disposed within the aperture 44 and has a pump impeller 50 secured thereto near the lower end thereof. A suitable combination seal and bearing 52 is disposed about the shaft 48 within the aperture 44 to provide a fluid seal therebetween and a bearing surface for the shaft 48.

The lower end of the shaft 48 is disposed within a bearing surface 54 that is placed in the lower side of the pocket 18 at the center thereof. The impeller 50 is mounted on the shaft 48 and wholly within the pocket 18 such that the latter, in effect, defines a pump casing.

The impeller 50 is of a known type and the blades thereof are formed so as to provide a pumping function as well as to disintegrate the solid organic wastes within the liquid mixture. A plate 56 is mounted on the bottom 16 of the housing 10 above the pocket 18 and includes a plurality of apertures 58, the size of which limits the size of the solid organic waste materials admitted to the pump casing formed by the pocket 18. Solid organic waste particles that are of such a size as to not pass through the apertures 58 are reduced in size by the eroding effect of the liquid drawn therepast by the impeller 50 and the buffeting within the tank portion 12 due to recirculation of the liquid mixture as will be seen.

The sterilizing chamber 14 is in the form of a generally elongated tube-shaped structure. As mentioned previously, the lower end 22 thereof defines an inlet which is aligned with the outlet 20 of the pocket 18. The sterilizing chamber 14 is secured in this position by means of bolts 60 bearing against a flange 62 on the lower end 22 of the sterilizing chamber 14. A suitable gasket 64 is interposed between the tank 12 and the sterilizing chamber 14.

An upper end 65 of the sterilizing chamber 14 includes a threaded aperture 66 through which a sheathed, U-shaped electrical element 68 is received within the sterilizing chamber 14. The upper end of the heating element 68 includes a threaded fixture 70 which is disposed in mating relationship with the threaded aperture 66 to provide a fluid seal. Additionally, electrical connecting terminals 72 are disposed above the threaded fixture 70 for connection to a source of power as will be seen.

On one side of the upper end 66 of the sterilizing chamber 14, there is provided an aperture 74 having a valve seat 76 on the side thereof opposite the interior of the sterilizing chamber 14. A ball 78 is disposed in sealing relationship against the valve seat 76 and is maintained in such a position by a spring 80 interposed between the ball and a flange 82 disposed within the tank 12 to form a conventional ball check valve.

On the side of the sterilizing chamber 14 opposite the aperture 74, a second aperture 82 is provided. A conduit 84 is disposed about the aperture 82 and interposed therebetween is a conventional thermostatically operated valve 86. The valve 86 comprises a sleeve 88 having an outwardly flared portion 90 in which a frusto-conical valve member 92 is seated. A bellows 94 is connected to the valve member 92 and to a support 96 which is maintained in place by the conduit 84 and the sides of the sterilizing chamber 14 surrounding the aperture 82. The arrangement is such that when the bellows 94 is heated to a predetermined temperature, the valve member 92 will move away from the outwardly flared portion 90 to thereby permit fluid to pass into the conduit 84. As will be seen, the temperature at which such action takes place is selected to be the temperature at which harmful bacteria in the liquid mixture containing the organic wastes could be destroyed and/or neutralized and thus, the valve 88 prevents discharge of the liquid mixture until it is in a harmless, non-polluting condition.

The valve 86 is selected to provide lesser resistance to fluid flow, when open, than the ball valve formed by the ball 78 and spring 80. Thus, when the valve 86 opens, recirculation will cease due to the closing of the ball valve in response to a lesser pressure in the sterilizing chamber 14. As a result, the tank will be quickly emptied without power wastage due to needless recirculation.

As best seen in FIG. 1, the conduit 84 is maintained in place by means of a flange 98 and bolts 100 and may have attached thereto a suitable pipe or hose leading to a convenient point for discharge of the sterilized liquid.

As mentioned previously, the invention contemplates the use of a control to provide economical operation thereof. The tube 40 forms a part of the control and includes at its lower end, a bell member 102 having a neck 104 which is secured to the lower end of the tube 40. The lower end 106 of the bell member 102 is spaced just above the lower end 16 of the tank 12, the spacing being such as to effectively preclude solid organic waste particles within the tank 12 from entering into the bell member 102 to plug the tube 40.

The upper end of the tube 40 extends from the upper end 24 of the tank 12 to a conventional, normally open pressure sensitive switch 108. While the switch 108 is conventional, for the sake of clarity, its nature will be explained briefly herein. The switch 108 includes a first contact 110 which is stationarily mounted and a second contact 112 which is mounted on a movable diaphragm 114. One side of the diaphragm 114 is in fluid communication with the inside of the tube 40 while the other side of the diaphragm 114 is in fluid communication with the atmosphere. Thus, it will be apparent that when a pressure somewhat greater than atmosphere is present within the tube 40, the diaphragm 114 will move slightly upward to thereby close a circuit between the switch contacts 112 and 110. When the pressure in the tube 40 is decreased, the atmospheric pressure on the opposite side of the diaphragm 114 will tend to restore it to the initial position as seen in FIG. 2 and thereby open the circuit. It should be noted that the nature of the diaphragm is such that it is somewhat stable in either of the two positions in which it may be placed. This is to say, when the diaphragm 114 is in a switch opening position, a slight increase in pressure within the tube 40 will not cause it to close. Rather, a predetermined pressure differential is required to move the diaphragm 114 to its second, switch closing position. Once the diaphragm 114 has reached its second, switch closing position, and the pressure differential begins to drop, the diaphragm 114 will stay in the second, switch closing position until the pressure differential is substantially gone and only at that time will it return to its first switch opening position. It is desirable that the pressure sensitive switch 108 has the characteristics just mentioned in order to prevent rapid fluttering of the diaphragm 114 which would tend to quickly pit the contacts 110 and 112 and render the circuit unreliable. Furthermore, such characteristics permit the level of liquid in the tank 12 before system operation is initiated and then permit operation to continue until the tank 12 is substantially emptied.

The control circuit utilized for the device will now be described. A lead 116 is connected between the contact 110 directly to one side of a source of power such as a battery. A pair of leads 118 and 120 are connected to one side of the heating element 68 and the motor 46, respectively. The other side of the motor 46 and the heating element 68 are connected by a lead 122 to the other side of the source of power. It will be apparent that the resulting arrangement is one in which a source of power is in series with the switch 108 and the parallel combination of the motor 46 and the heating element 68 such that when the switch 107 is closed, both the motor 46 and the heating element 68 will be energized. When the switch 108 is opened, both the motor 46 and the heating element 68 will be deenergized.

Turning now to FIG. 4, there is seen a block representation of a system in which the sterilizer is to be used. A water closet is arranged to discharge the usual liquid mixture containing organic wastes, some of which may be in solid form, into a sterilizer made according to the invention and described previously. The discharge from the water closet will, of course, enter the sterilizer through the inlet 30. The sterilizer is connected to a source of power as previously described to control its operation. It may also have a connection to a vent if necessary. The liquid mixtures containing the organic wastes discharged into the sterilizer are then sterilized thereby and, when sterilized, are finally discharged.

The sterilizing operation takes place as follows. In the course of normal use of the water closet, a liquid mixture containing the organic waste materials is discharged therefrom through the inlet conduit 30 into the tank 12 of the sterilizer. After a number of uses of the water closet, the level of the liquid mixture within the tank 12 may attain a level such as that indicated at A in FIG. 2. Since there is a good deal of liquid in the tank 12 at this time, it will be apparent that the level thereof will tend to cause the liquid to flow up into the tube 40 thereby increasing the pressure exerted against the underside of the diaphragm 114. When the preset level is reached in the tank 12, the pressure differential across the diaphragm 114 will be sufficient to close the contacts 110 and 112 thereby energizing the motor 46 and the heating element 68. As a result, the motor 46 will rotate the impeller 50 thereby pumping the liquid mixture through the sterilizing chamber 14 where it will contact the energized heating element 68. Initially, the temperature of the liquid mixture will be relatively cool and accordingly, the valve 88 will be closed. The pressure increase in the liquid caused by action of the impeller 50 will cause the ball valve 78 to leave the seat 76 to permit the liquid mixture to reenter the tank 12. Such recirculation of the liquid mixture will continue as long as the motor 46 is energized and it will be appreicated that within a very short period, the action of the energized heating element 68 will bring it up to a temperature sufficient to destroy or neutralize the harmful bacteria contained therein. It should also be noted that during the recirculating operation, solid particles in the liquid mixture will be disintegrated by the action of the impeller 50 and the eroding and buffeting effects mentioned previously.

When the temperature of the liquid mixture has reached the sterilizing temperture, the condition will be sensed by the bellows 94 of the valve 88 and as a result, the valve 88 will be opened. Since the valve 88, when opened, presents less resistance to the flow of fluids than does the ball valve 78, it will be apparent that recirculation of the liquid mixture will essentially stop, and the continued action of the impeller 50 will force the now sterilized mixture through the valve 88 into the conduit 84 from which it may be directed to a suitable discharge point. The discharging of the now sterilized liquid mixture will continue until the level within the tank 12 is reduced to a level such as that indicated by B in FIG. 2 at which time, the pressure differential across the diaphragm 114 will be almost nonexistent thereby allowing the diaphragm 114 to return to its first, switch opening position. When the contacts 110 and 112 open as a result of such movement of the diaphragh 114, the pump 46 and the heating element 68 will be deenergized and will remain in such a deenergized condition until the water closet has been operated a sufficient number of times to return the level within the tank 12 to that generally indicated at A.

From the foregoing, it will be apparent that a sterilizer made according to the invention provides a number of advantages including that of economical operation in that special additives are not required and the temperature of the liquid mixture is raised only to a sterilizing point. Obviously, for similar volumes of liquid mixtures, much less heat is required to raise the temperature of the mixture to a sterilizing temperature than is required to cause combustion thereof. For example, in order to cause combustion, it will be apparent that not only must the temperature of the solid organic waste materials be increased to the temperature of ignition, but the liquid must be evaporated and this, of course, requires the supplying of a great deal of heat to provide the heat evaporation of the liquid. Thus, it will be apparent that the sterilizer made according to the invention is significantly cheaper to run in terms of power requirements of operation thereof.

Furthermore, it will be apparent that since the sterilized mixture is discharged in a liquid state, there is substantially no residue left in the sterilizer as would be the case if the organic wastes were oxidized to the point of combustion. As a result, the sterilizer requires very little maintenance in the form of cleaning. It will also be apparent that the nature of the system tends to preclude corrosion of the sheathing of the heating element 68 in that whenever the heating element 68 is energized, the liquid surrounding it is in a constantly moving state which thereby tends to inhibit the buildup of corrosion or scale on the heating element 68.

Finally, it will be apparent that there is no need to provide great amounts of insulation with a sterilizer made according to the invention in order to prevent the device from being a fire hazard in that all exposed parts of the device are maintained at a temperature significantly lower than the kindling temperatures of the materials usually found in the environment in which a sterilizer is to be used by virtue of the relative cooling effect of the liquid mixture which contacts the internal surface of all exposed parts.

While I have described a specific embodiment of my invention as required by 35 USC 112, I do not wish to be limited to the precise details set forth, but rather, to have my invention construed according to the true spirit thereof as set forth in the following claims.

I claim:

1. A controlled discharge sterilizer for use with water closets for sterilizing a liquid mixture having organic wastes therein comprising: a housing divided into a tank for receiving said liquid mixture and a sterilizing chamber for sterilizing said liquid mixture; means providing a continuous flow path for said liquid mixture and including said tank and said sterilizing chamber; pump means for circulating said liquid mixture in said continuous flow path; heating means associated with said sterilizing chamber for sterilizing said liquid mixture as it passes in said continuous flow path thru said sterilizing chamber by heating said liquid mixture to a sufficiently high temperature such that harmful bacteria contained in said liquid mixture are destroyed and/or neutralized; and means in said flow path normally maintaining said liquid mixture in said flow path and responsive to the attainment of said temperature for discharging said liquid mixture from said sterilizer.

2. The controlled discharge sterilizer of claim 1 further including control means for said pump means and said heating means responsive to the admission of a predetermined amount of said liquid mixture to said housing for activating said pump means and said heating means to sterilize said liquid mixture and responsive to the discharge of a predetermined amount of said liquid mixture for deactivating said pump means and said heating means.

3. The controlled discharge sterilizer of claim 1 wherein said last-named means comprises a valve having heat responsive actuator means for opening said valve when said liquid mixture attains said temperature.

4. The controlled discharge sterilizer of claim 1 wherein said housing includes inlet means for interconnecting said housing to a water closet.

5. The controlled discharge sterilizer of claim 4 further including a water closet connected to said inlet means.

6. A controlled discharge sterilizer adapted to be used with a water closet for sterilizing a liquid mixture containing organic wastes comprising: a housing having an inlet and an outlet, said inlet including means for interconnecting said housing and a water closet such that said housing may receive said liquid mixture from said water closet; heating means associated with said housing for heating said liquid mixture to a sterilizing temperature and defining a heating zone; means in said housing for circulating said liquid mixture to said heating zone; and a heat response discharge valve associated with said outlet for normal maintaining said liquid mixture in said housing, said valve being responsive to the attainment of said sterilizing temperature by said liquid mixture to thereby open and discharge said liquid mixture.

7. A controlled discharge sterilizer for use with a water closet for sterilizing a liquid mixture containing organic wastes, said sterilizer comprising: a tank having an inlet adapted to be associated with a water closet and an outlet, a check valve in said inlet for permitting influx of said liquid mixtures into said tank while precluding backflow of matter from said tank; pump means operatively associated with said outlet and including disintegrator means for disintegrating organic wastes in solid form in said liquid mixture; a sterilizing chamber in communication with said outlet, said chamber having a first outlet in communication with said tank to permit recirculation of said liquid mixture and a second outlet for discharging said liquid mixtures; heating means in said sterilizing chamber for heating said liquid mixture to a sterilizing temperature sufficient to destroy and/or neutralize harmful bacteria in said liquid mixture; means in said first outlet for providing a predetermined resistance to recirculating flow of said liquid mixture; valve means in said second outlet, said valve means, when open, having a resistance to discharge flow of said liquid mixture less than the resistance of said resistance providing means; thermostatic valve operator means for said valve means and responsive to the attaining of said sterilizing temperature by said liquid mixture to open said valve means; and level sensing means associated with said tank for energizing said pump means and said heating means when the liquid mixture in said tank reaches a first predetermined level and for subsequently deenergizing said pump means and said heating means when the level of said liquid level mixture has been reduced to a second predetermined level less than said first predetermined level.

8. The controlled discharge sterilizer of claim 7 wherein said pump means comprises a motor mounted on said tank and an impeller driven thereby in said tank; said heating means comprises an electrical heating element; and said level sensing means includes a pressure sensitive switch communicating with said tank.

9. The controlled discharge sterilizer of claim 8 further including a water closet communicating with said inlet.

10. A controlled discharge sterilizing system comprising: a water closet; a sterilizer comprising a housing; heating means associated with said housing for elevating the temperature of the contents thereof to a temperature sufficient to render harmless bacteria therein; means interposed between said water closet and said sterilizer for providing a conduit for the flow of a liquid mixture containing organic wastes from said water closet to said sterilizer; and means normally maintaining said liquid mixture in said housing and responsive to the attainment of said temperature sufficient to render bacteria harmless by said liquid mixture for discharging said liquid mixture from said housing.

References Cited
UNITED STATES PATENTS

| | | | |
|---|---|---|---|
| 2,131,711 | 9/1938 | Porteous | 4—8 |
| 2,938,630 | 5/1960 | Novak | 210—64 XR |
| 2,998,139 | 8/1961 | Novak | 210—64 XR |
| 3,032,776 | 5/1962 | Obert et al. | 4—1 |
| 3,275,550 | 9/1966 | Daubenspeck | 4—77 XR |
| 3,320,907 | 5/1967 | Duncan | 4—131 XR |
| 3,342,337 | 9/1967 | Reid | 4—1 XR |

LAVERNE D. GEIGER, *Primary Examiner.*

H. K. ARTIS, *Assistant Examiner.*